(12) United States Patent
Vowe et al.

(10) Patent No.: US 11,184,145 B2
(45) Date of Patent: Nov. 23, 2021

(54) FILTER AND METHOD FOR PROCESSING AN INPUT SIGNAL

(71) Applicant: Infineon Technologies AG, Neubiberg (DE)

(72) Inventors: Achim Vowe, Merching (DE); Jens Barrenscheen, Munich (DE); Ning Chen, Munich (DE); Cristina Sanchez, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/988,047

(22) Filed: Aug. 7, 2020

(65) Prior Publication Data

US 2021/0044415 A1 Feb. 11, 2021

(30) Foreign Application Priority Data

Aug. 9, 2019 (DE) .......................... 102019121506.4

(51) Int. Cl.
*H04L 7/033* (2006.01)
*H04L 7/027* (2006.01)
*G06F 1/10* (2006.01)

(52) U.S. Cl.
CPC ................ *H04L 7/033* (2013.01); *G06F 1/10* (2013.01); *H04L 7/027* (2013.01)

(58) Field of Classification Search
CPC ............ H04L 7/033; H04L 7/027; G06F 1/10
See application file for complete search history.

(56) References Cited

U.S. PATENT DOCUMENTS

| 2002/0080901 | A1* | 6/2002 | Ham, III | ............... H03L 7/1075 375/376 |
| 2014/0126678 | A1* | 5/2014 | Cirit | ........................ H04L 7/033 375/375 |
| 2014/0211898 | A1* | 7/2014 | Katoh | .................... H03K 5/135 375/371 |

FOREIGN PATENT DOCUMENTS

EP 3598409 A1 1/2020

OTHER PUBLICATIONS

Office Action, in the German language, from counterpart German Application No. 102019121506.4, dated Jun. 18, 2020, 7 pp.

* cited by examiner

*Primary Examiner* — Janice N Tieu
(74) *Attorney, Agent, or Firm* — Shumaker & Sieffert, P.A.

(57) ABSTRACT

According to an embodiment, a receiver is described comprising an input configured to receive a digital input signal and a digital filter configured to deliver a filtered digital output signal and to deliver stability information wherein the digital filter is configured to enter or stay in a transition state after a transition at the input signal, leave the transition state when the input signal is considered being stable, update the output signal when leaving the transition state and deliver the stability information indicating transitions at the input signal during transition state.

18 Claims, 14 Drawing Sheets

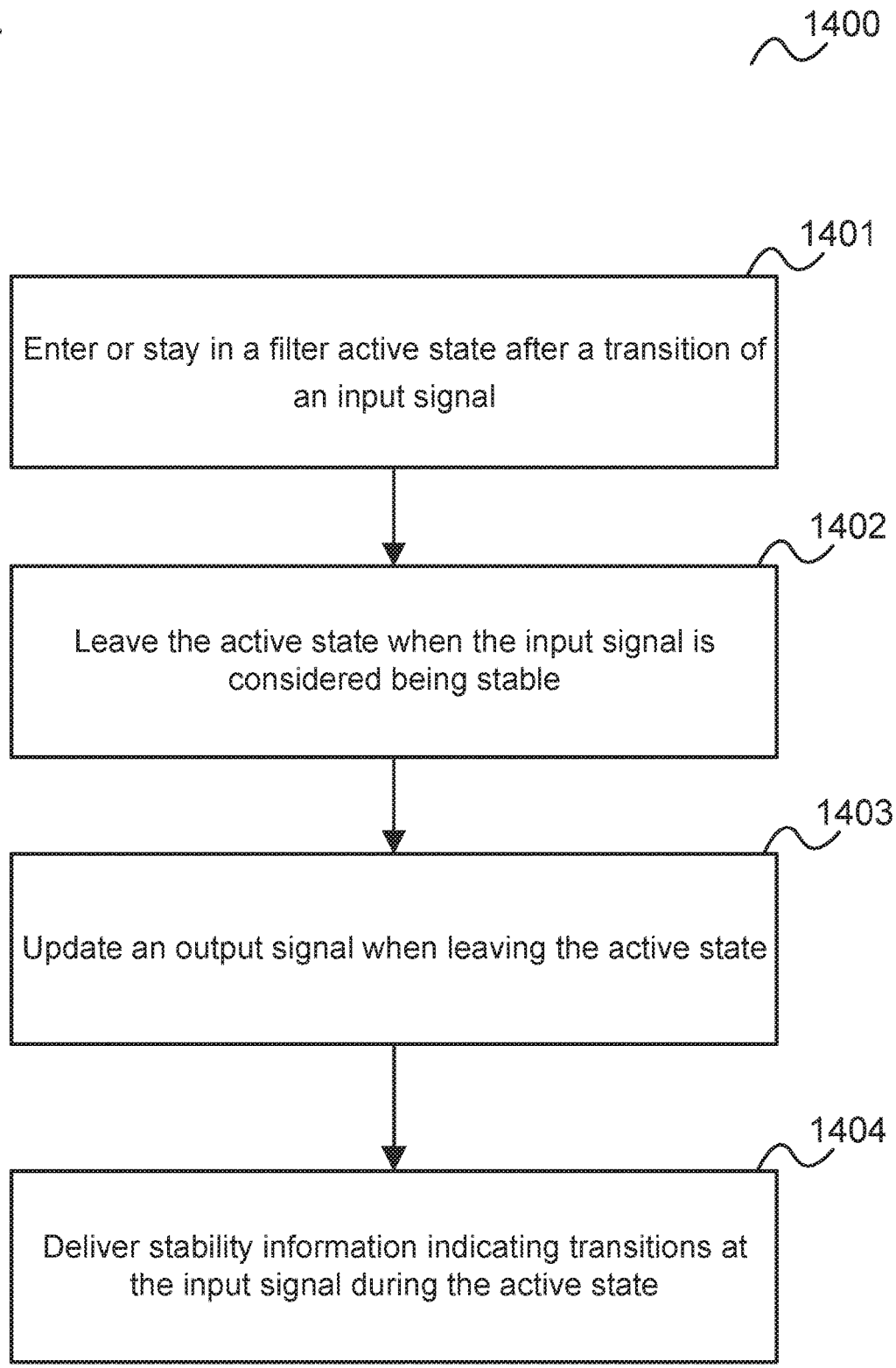

FILTER AND METHOD FOR PROCESSING AN INPUT SIGNAL

CROSS-REFERENCE TO RELATED APPLICATIONS

This application claims priority to German Patent Application Number 102019121506.4, filed Aug. 9, 2019, the entire content of which is incorporated herein by reference.

TECHNICAL FIELD

The present disclosure relates to filters and methods for processing an input signal.

BACKGROUND

In an ideal world, a receiver of a signal would receive an exact representation of the original signal transmitted by the transmitter. This would allow the receiver to correctly decode the message content. In the real world, however, typically a disturbed version of the ideal signal arrives at the receiver.

There are several causes for this distortion. On the one hand, there are typically deviations between the oscillators of the transmitter and receiver, consisting in a frequency offset between the oscillators and/or frequency fluctuations on one or both sides (drift with higher-order components). These deviations are e.g. caused by oscillator aging, process fluctuations, voltage fluctuations, temperature changes and use of inferior oscillators (cost-saving measures).

On the other hand, the communication line used for transmission of the signal is disturbed in practical application, e.g. by noise, disturbances due to coupling effects (e.g., from other high frequency circuit components), or a varying delay of a transmitting or receiving module used for transmission.

Accordingly, approaches for handing disturbances in received input signals are desirable.

SUMMARY

According to an embodiment, a receiver is provided including an input configured to receive a digital input signal and a digital filter configured to deliver a filtered digital output signal and to deliver stability information wherein the digital filter is configured to enter or stay in a transition state after a transition at the input signal, leave the transition state when the input signal is considered being stable, update the output signal when leaving the transition state and deliver the stability information indicating transitions at the input signal during transition state.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 14 shows a flow diagram illustrating a method for processing a digital input signal.

DETAILED DESCRIPTIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
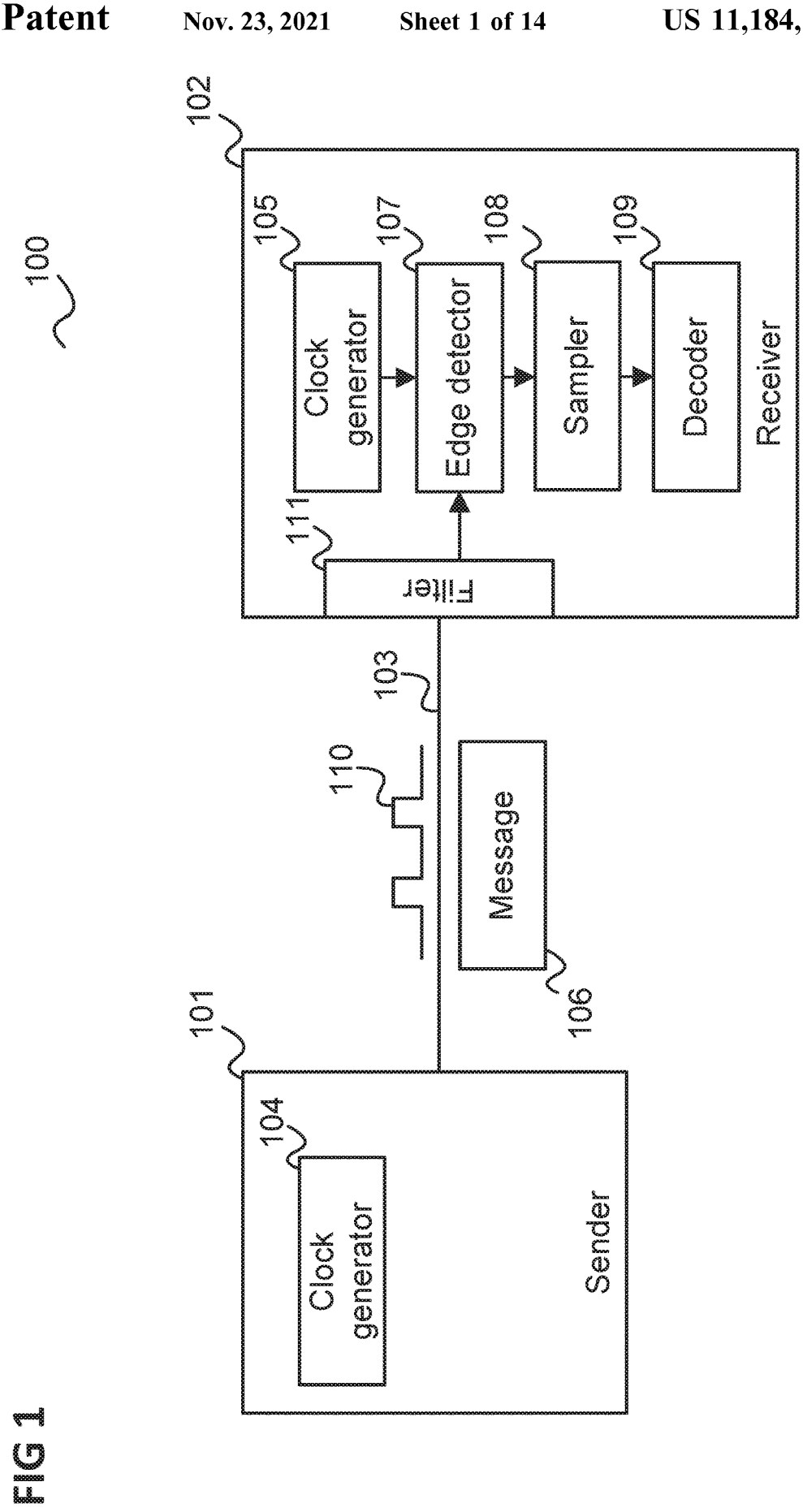
FIG. 1 shows a data transmission arrangement for transmitting data from a sender to a receiver via a communication channel.

FIG. 1 shows a data transmission arrangement 100 for transmitting data from a sender 101 to a receiver 102 via a communication channel 103.

The communication channel 103 may be a radio communication channel or for example a computer bus, e.g. a bus in a vehicle. In modern vehicles, various bus systems can be used for communicating information between various components. Examples are the CAN (Controller Area Network), Flexray, LIN (Local Interconnect Network) and SENT (Single Edge Nibble Transmission). A typical field of application for such a bus system is the networking of a vehicle door, a seat, air conditioning flaps or the various light sources of an interior lighting system.

The transmitter 101 and the receiver 102 have a respective clock generator 104, 105. The clock generators 104, 105 have, for example, oscillators.

The data transmission arrangement 100 can be arranged, for example, in a vehicle. In this case, the transmitter 101 is for example a sensor and the receiver 102 is for example a control device in the vehicle.

For receiving a message 106 sent by the transmitter 101, the receiver 102 has an edge detector 107, a sampling device (sampler) 108 and a decoder 109, depending on the protocol used. The message 106 is represented by a digital communication signal 110 transmitted via the communication channel 103 to the receiver 102. The digital communication signal 110 may for example be transmitted by modulation of a carrier transmitted over the air or via a communication line.

Depending on the protocol used, the decoder 109 decodes the message based on the position of the edges detected by the edge detector 107 in the digital received signal or based on samples of the signal detected by the sampler 108. The sampler 108 and/or the decoder 109 (depending on the protocol used) operate according to the timing specified by the clock generator 105 of the receiver 102. The message 106 corresponds to one or more frames of the transmission protocol.

In a serial communication channel 103 distortions of the communication signal 110 can occur. It is possible that sporadic glitches occur but it is also possible that periodically recurring distortions and noise are present on the communication line on which the communication channel 103 is based. In the following description, the wording "glitch" is used for all types of noise or signal distortion that leads to an unintended, temporary change of the data contents (e.g. a voltage level on a signal line, a current level, etc.) of the received signal or data stream. Depending on the source of the distortion or noise (e.g. due to capacitive or inductive coupling, ground shift or ground bouncing or instable comparator outputs close to the comparator switching point, etc.) the length and the intensity of the distortion may vary.

The same applies for single wire digital communications, where the relevant information is, for example, encoded in the time when a digital transition from one signal level to another signal level occurs, e.g. in the time distance between edges, such as in case of a communication channel operating according to the SENT protocol.

An example is a sensor feeding a comparator with an analog input signal and the resulting digital comparator output being transferred (as message 106) over a wire to another device (receiver 102). In this particular example, noise is not only introduced from other sources, but also occurs as part of the comparator based analog to digital conversion, where glitches are likely to occur during the times when the analog input signal is close to the comparator switching threshold value. The issue here is to retrieve the correct transition information despite the presence of the noise and also to ensure the safety and reliability requirements.

Figure 2:
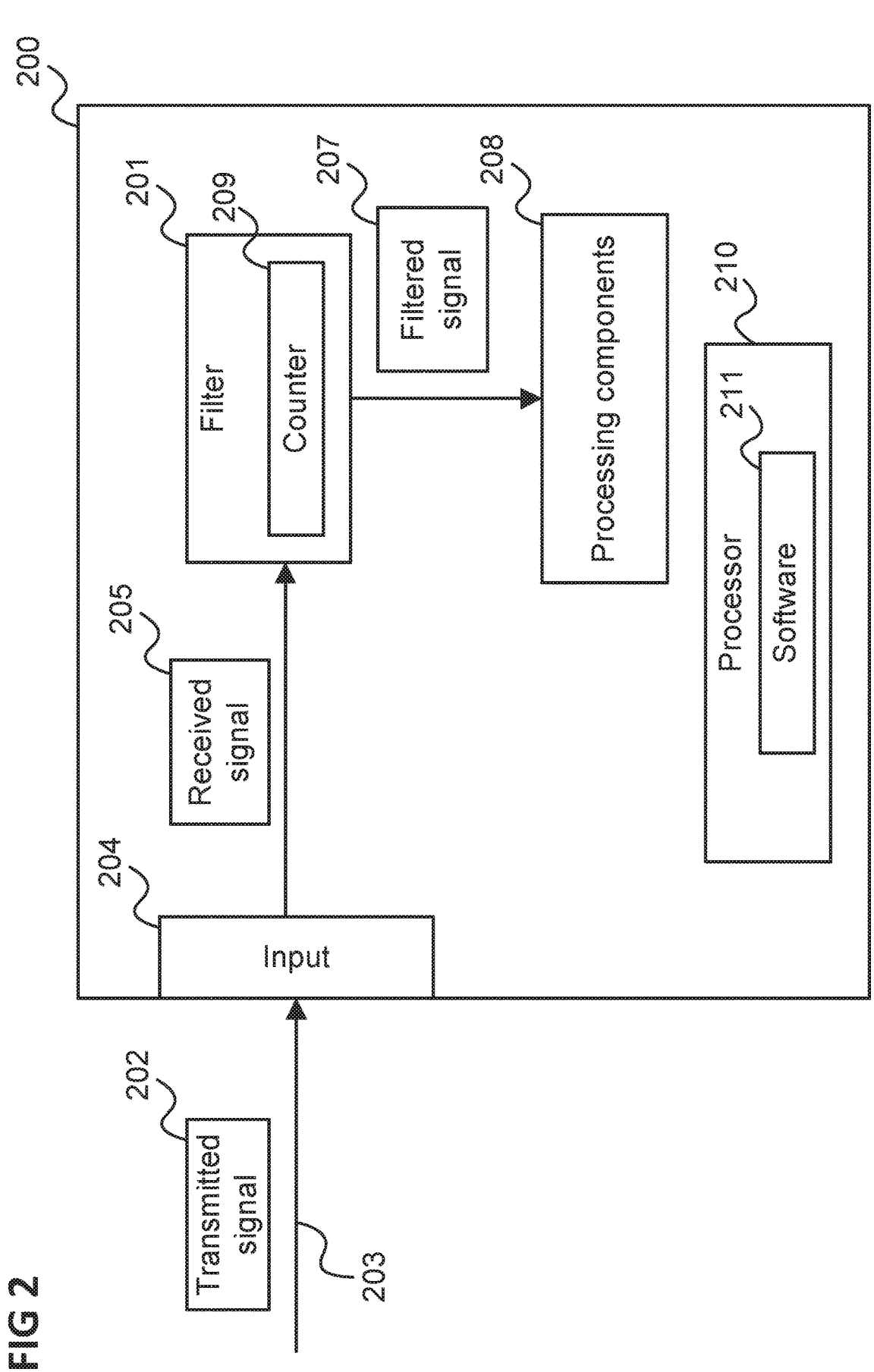
FIG. 2 shows a receiver having a disturbance filter.

A disturbance filter 111 may be used to mitigate disturbances of a signal received by a receiver 102 and to present a clean signal to the protocol processing stages that come after the disturbance filter, i.e. the edge detector 107 in the above example, as it is illustrated in more detail in FIG. 2.

FIG. 2 shows a receiver 200 having a disturbance filter 201.

A transmitted signal 202, e.g. corresponding to signal 110, is transmitted via a communication line 203, e.g. forming the (physical) basis of communication channel 103, to an input 204 of the receiver 200. The received signal 205 is supplied to a disturbance filter 201 which generates a filtered signal 207 and provides it to processing components 208 (e.g. corresponding to edge detector 107 etc.).

A digital disturbance filter may be based on a counter 209 which can be seen to model a simple first order linear RC filter. This means that the disturbance filter includes an input signal "A" (corresponding to received signal 205), an output signal "B" (corresponding to filtered signal 207), a counter value "COUNT" and a filter depth "DEPTH".

Figure 3:
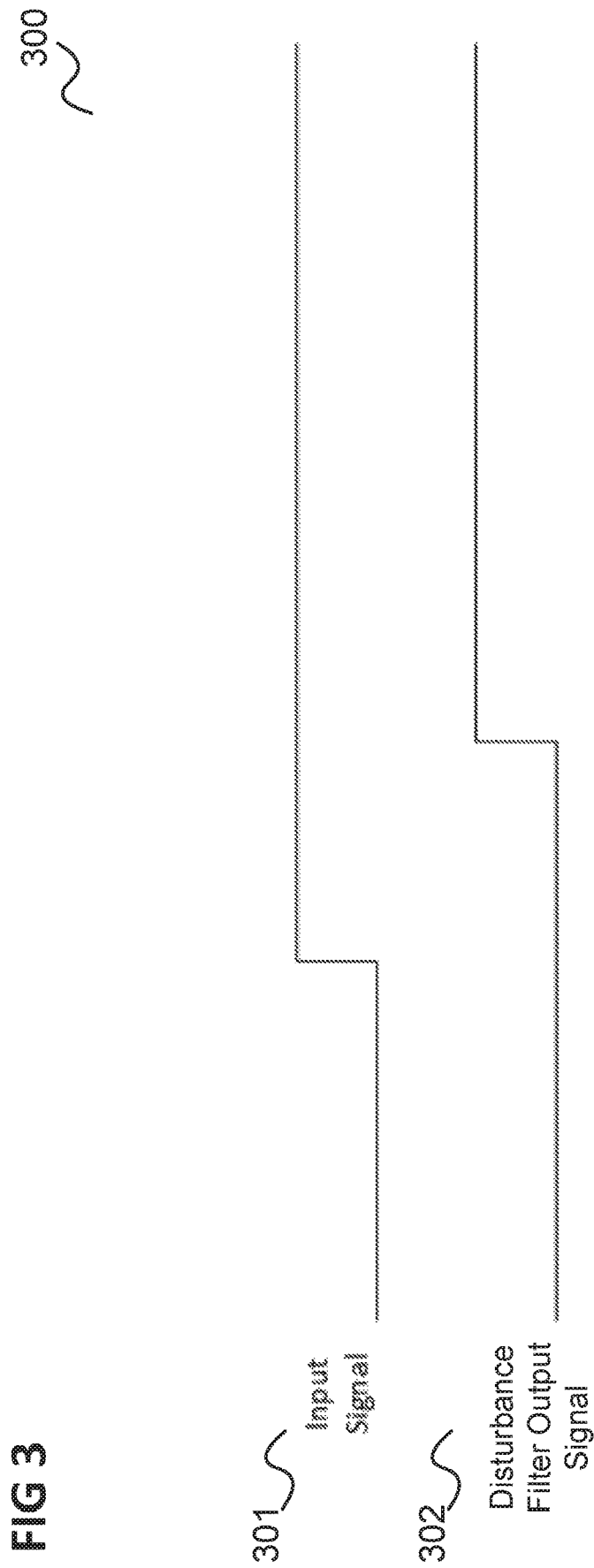
FIG. 3 shows a signal diagram showing an example of a disturbance filter input signal and a disturbance filter output signal in case of no disturbances.

FIG. 3 shows a signal diagram 300 showing an example of a disturbance filter input signal 301 (corresponding to received signal 205) and a disturbance filter output signal 302 (corresponding to filtered signal 207) in case of no or reduced disturbances (i.e. no glitches, no noise etc.).

It should be noted that herein, a received signal supplied to a filter is in general a digital signal which may alternate between two logic levels.

Figure 4:
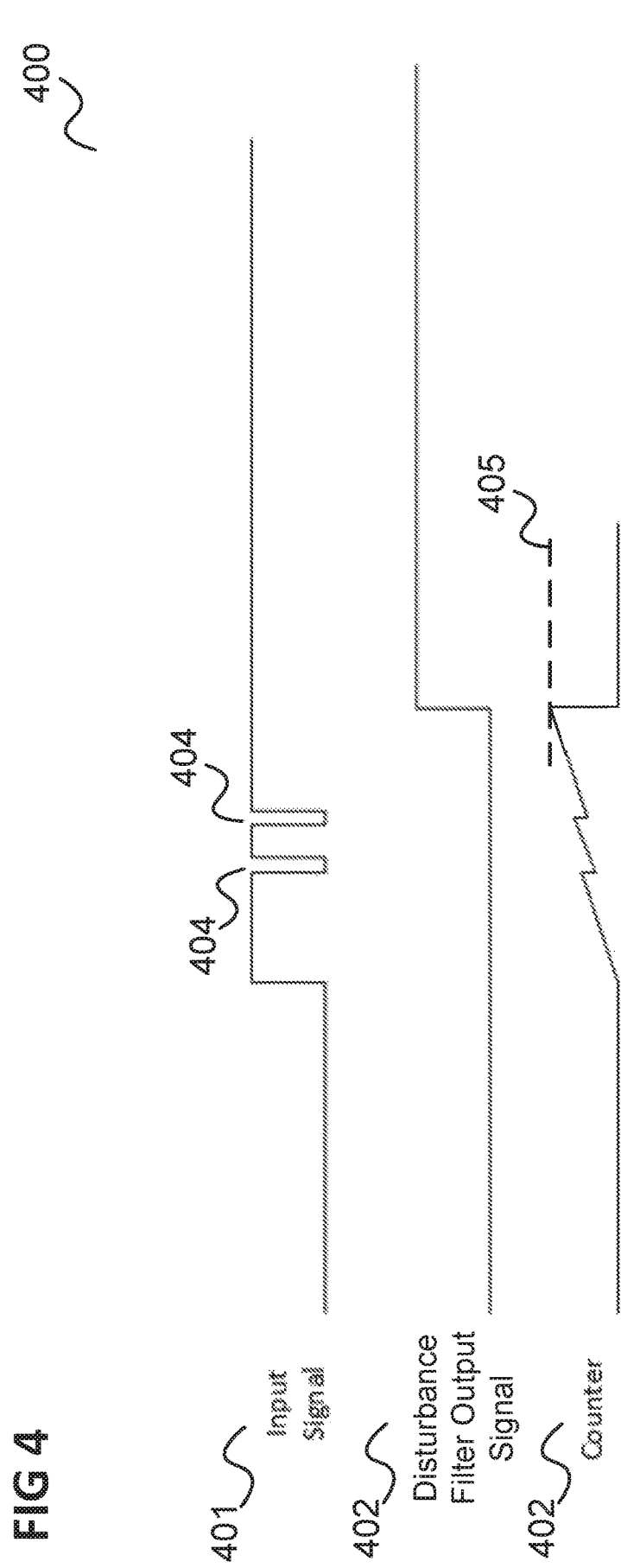
FIG. 4 shows a signal diagram showing an example of a disturbance filter input signal, a disturbance filter output signal and a counter value in case of glitches.

FIG. 4 shows a signal diagram 400 showing an example of a disturbance filter input signal 401, a disturbance filter output signal 402 and a counter value 403 in case of glitches 404.

When the input signal 401 is not equal to the output signal then the counter value 403 is incremented (e.g. by 1 per counter clock cycle, e.g. of clock generator 105). The frequency of the clock generator for the filter counter counting up or the incremental step may be adjusted according to the desired filter time.

When the input signal 401 equals the output signal 402 then the counter value 403 is decremented (e.g. by 1 per counter clock cycle), but it is not decremented below 0. The frequency of the clock generator for the filter counter counting down or the decremental step may be adjusted according to the desired filter time and may differ from the values applied while counting up.

When the value of the counter 403 reaches the value of a filter threshold 405 filter depth then the disturbance filter 201 changes the signal output 402 so that it equals the input signal 401. Also, at this point, the disturbance filter 201 may clear the counter to 0. It should be noted that the filter threshold 405 corresponds to the filter depth: when the counter starts counting and continuously counts upward, the counter value reaches the filter threshold 405 after filter depth clock cycles.

With this filtering approach an output signal changes to a new value only when this new value has been present on the input for at least filter depth clock cycles (possibly longer in case the counter counts down in between). Signal transitions which are shorter than the filter depth are considered as glitches or noise and are suppressed as illustrated in FIG. 5.

Figure 5:
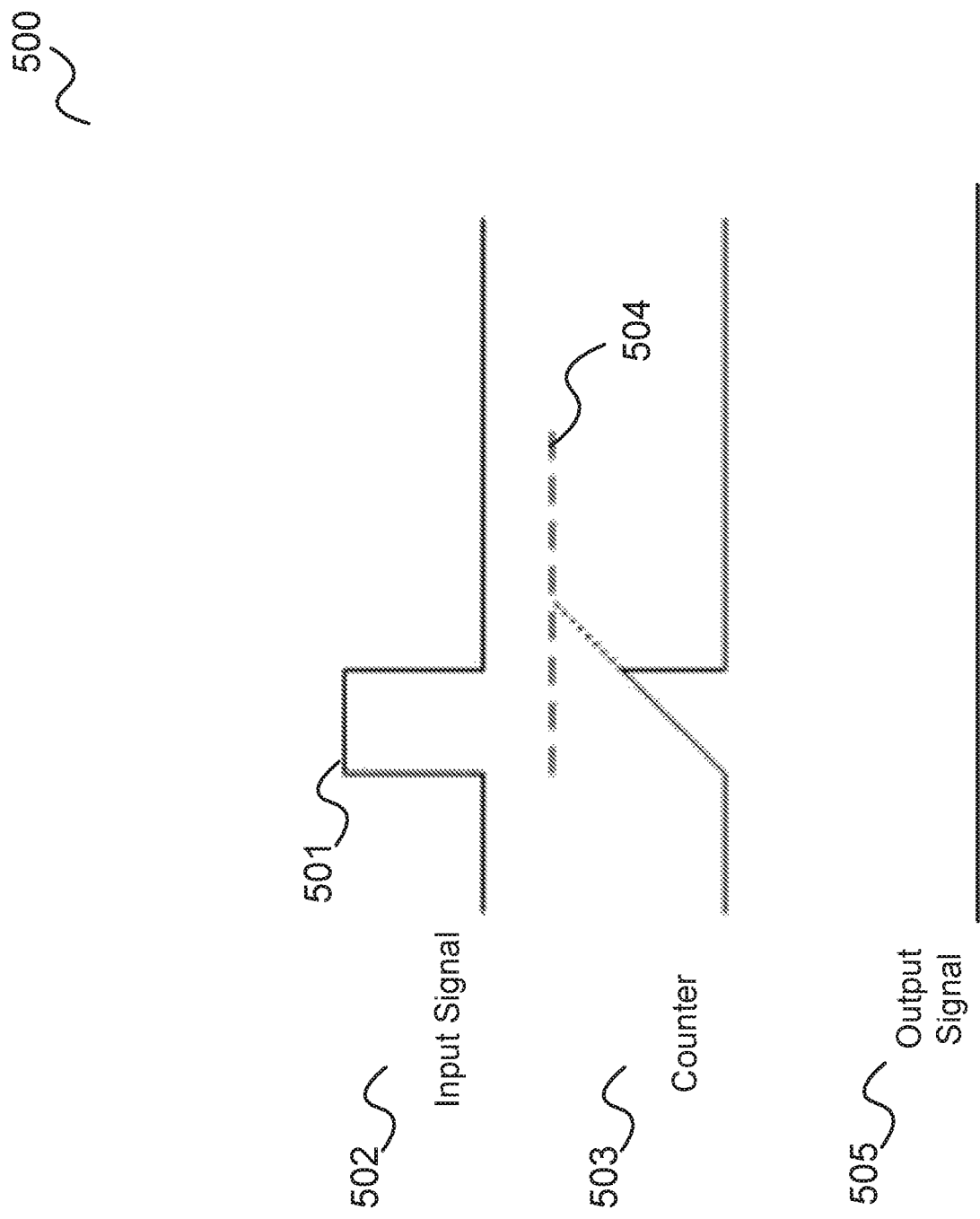
FIG. 5 shows a signal diagram illustrating the suppression of a short glitch in an input signal.

FIG. 5 shows a signal diagram 500 illustrating the suppression of a short glitch 501 in an input signal 502. The glitch 501 is suppressed in the output signal 505 because it is too short for the counter value 503 to reach the filter threshold 504.

However, depending on the distortions present on the signal line 203 and the nature of the communication protocol in use (e.g. SENT protocol) the signal smoothing capabilities of the disturbance filter 201 may not always be sufficient for having a clean enough filtered signal 207 to ensure reliable communication.

Therefore, according to various embodiments, instead of only communicating resulting filtered information 207 to the protocol processing stage (i.e. processing components 208), filtering approaches are used which (besides possibly providing improved signal filtering capabilities) provide communication of quality information about the received signal 205 to the protocol processing stage 208 (and/or application software).

Figure 6:
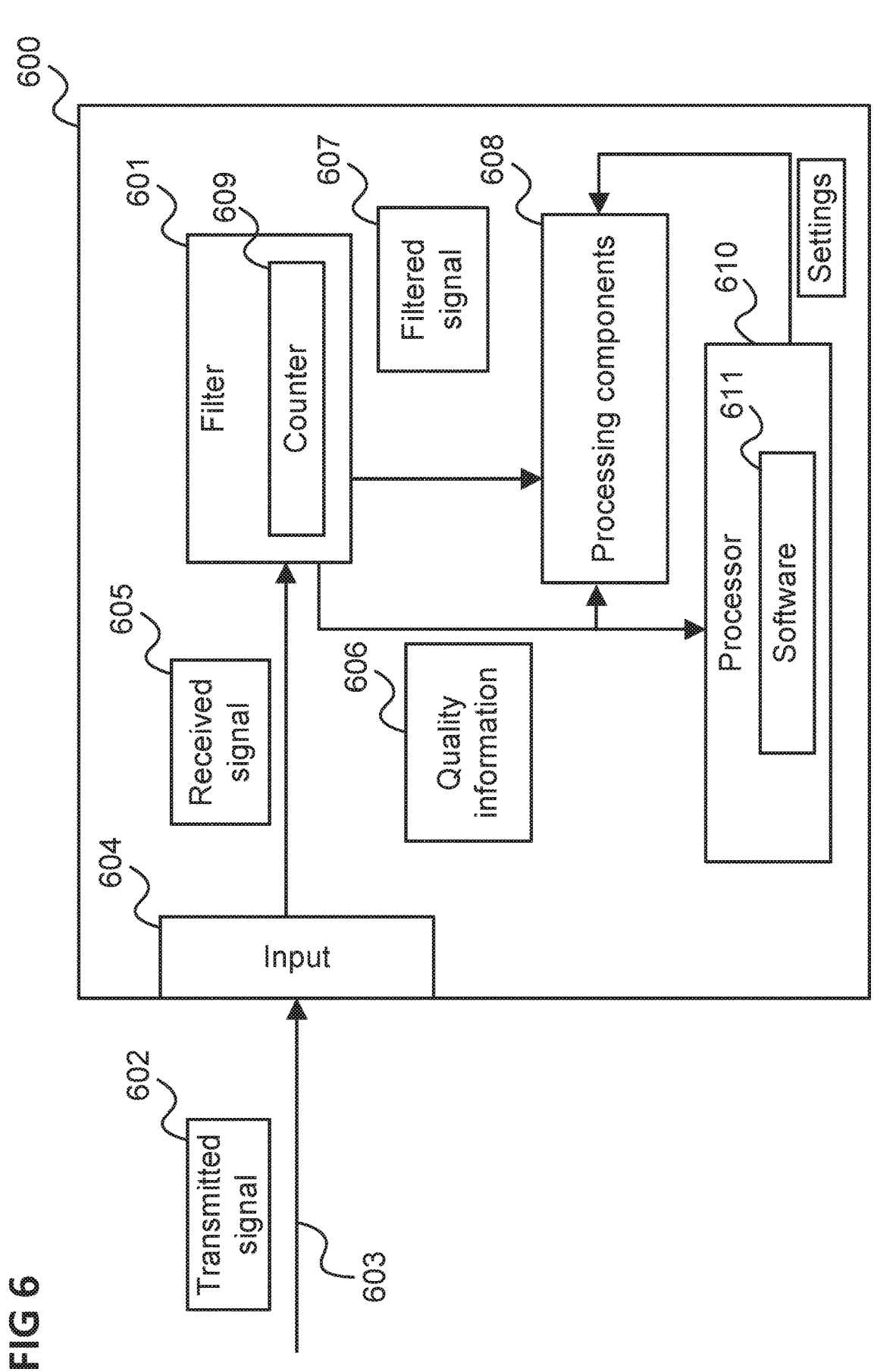
FIG. 6 shows a receiver according to an embodiment.

FIG. 6 shows a receiver 600 according to an embodiment.

Similarly to FIG. 2 a transmitted signal 602 is transmitted via a communication line 603 to an input 604 of the receiver 600. The received signal 605 is supplied to a disturbance filter 601 (with counter 609) which generates a filtered signal 607 and provides it to processing components 608. The receiver 600 may further include a processor 610 running application software 611. The processing components 608 (e.g. including protocol processing stage components such as an edge detector 109 etc.) provide the processor 610 with the filtered signal 607. It should be noted that parts of the protocol processing stage components may also be implemented by the processor 610.

In addition to the filtered signal 607, the disturbance filter 601 also provides quality information 606 to the processing components 608 and/or the processor 610 (e.g. to be processed by the software 611). In some embodiments the processor may treat the quality information and may change settings of the processing components, such as delays, sampling points or selections means.

This enables the protocol processing stage to also evaluate this information in order to enhance the reliability of the communication and also to provide reliability information towards the end user (e.g. to the software application layer). The latter may be especially important in the context of safety as it further enables the detection of communication faults. For example in a redundant communication setup with two or more communication channels it enables the software 611 to select the more reliable one.

Thus, according to various embodiments, the disturbance filter 601 not just filters disturbances to present a clean output signal 607 but also communicates the presence of disturbances, for example, as additional information 606. So the disturbance filter 601 has the two outputs 1. Filtered version 607 of the input signal 205
2. Quality information 606 to indicate the level of purity of the input signal 605.

The quality information 606 may for example include one or more of the following:
- How many glitches or unexpected changes since last signal transition (i.e. last edge, with unexpected=shorter than a defined threshold)
- How long are the glitches=how long did it take to achieve a stable transition
- Distance between glitches
- an indication that a glitch is being present currently on the input signal 605 (i.e. the filter 601 is in a transition phase where it is not yet clear whether it is a real transition leading to an update of the filter output or whether there is just a disturbance)
- an indication that a glitch is present around a certain time window before and after the start of the filter counter.

It should be noted that the quality information 606 may include a sequence of information elements q, q1, q2, . . . which is provided by the filter 601. For example, according to a predetermined time frame, e.g. a certain period of the filtered signal 207, the filter 601 provides a corresponding information element (e.g. including one or more of the above).

The disturbance filter 601 may perform intelligent filtering that corrects the input signal 605 in a way as if the glitches were not present in the first place (in the input signal). In some embodiments, a delay in the output of the filter is allowed as long as the delay is more or less similar for all transitions at the output signal.

According to one embodiment, for example in case of a communication using the SENT protocol (but CAN, UART (Universal Asynchronous Receiver Transmitter), SPI (Serial Peripheral Interface) and other protocols may also be used), the quality information 606 of the filter 601 is used for diagnostics, e.g. by software running on the processor 610.

A SENT message consists of a series of edges, where the message information is encoded in the time between two adjacent edges. To reveal a quality indication for a received message, the receiver 600 may collect quality information 606 for each edge provided by the filter 601 and form it into a consolidated overall edge quality index of the received signal 605 (or for the received message).

In a simple case, a component of the receiver, e.g. of processing components 608, may look for the worst edge (i.e. the most glitch polluted edge) and report the quality index of this one along with the decoded receive data upon an end of frame, e.g. to software 611. A more advanced evaluation could also give more weight to edges which are at a strategically important place within the protocol (e.g. synchronization edges), and/or report them separately. The receiver hardware 600 can for example implement a dedicated Safety Status Register to store the quality index.

The application software 611 can then use the quality index along with the received message to make conclusions about the further usage of the received message. For example, in a safety application based on the redundant operation of two or more SENT channels (e.g. connected to redundant sensors), the application software 611 can get an early failure indication for channels with increasing glitch occurrence. It will then prefer the data from the other, still reliable channel(s) and may also store a notification, e.g. a system logging memory, that the failing channels need replacement as soon as possible (e.g. at next car service time).

Figure 7:
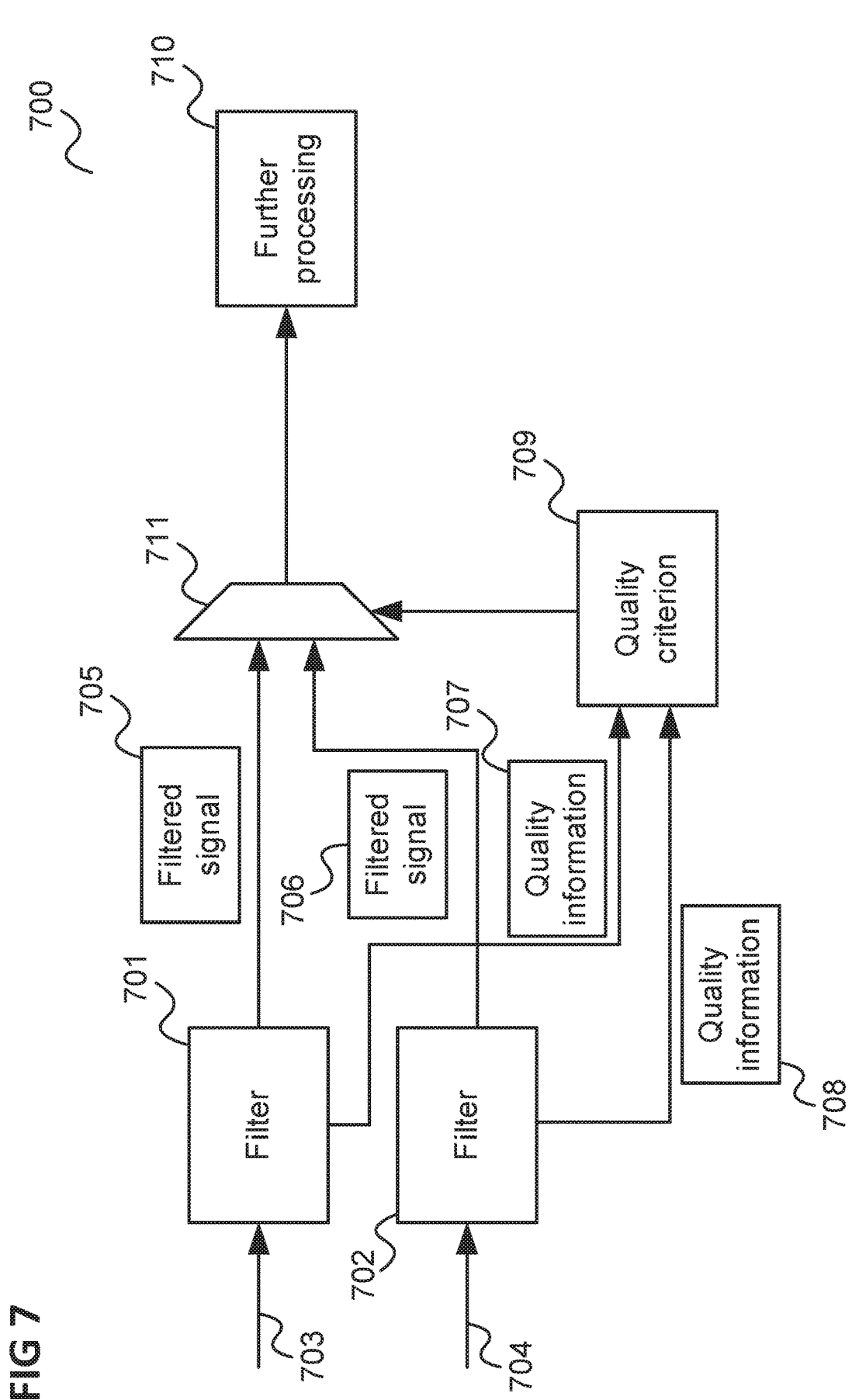
FIG. 7 shows an example of a receiver receiving signals via redundant communication channels.

FIG. 7 shows an example of a receiver 700 receiving signals via redundant communication channels.

The receiver 700 includes a first disturbance filter 701 provided with a first (received) signal which the receiver receives via a first communication line 703 and a second disturbance filter 702 provided with a second (received) signal which the receiver receives via a second communication line 704, similarly to the case of one communication line as illustrated in FIG. 6.

Each disturbance filter 701, 702 filters its respective received input signal to generate a respective filtered signal 705, 706 and provides it to a selector 711. Further, each disturbance filter 701, 702 provides respective quality information 707, 708 as described to a controller 709. The controller 709 determines, based on the quality information 707, 708, which signal's quality is higher and controls the selector 711 such that it provides the signal with the quality information indicating the better quality to processing components 710. Selector 711 is depicted as a multiplexer that selects between one input signal or another one. In one embodiment, the selector may also generate a combined output signal from both input signals by combining both with a weighing factor for each input signal. The weighing factor may be derived from the quality information for each input signal, e.g. an input signal with a higher quality may get more weight than an input signal with a poor quality. The elaboration of the weighing factors may be done once within a defined time interval (e.g. one or more messages on the bus) or for a defined number of events (e.g. a certain number or type of transitions in the signals).

For example, the communication lines 703, 704 correspond to two separate signal paths from two sensors (or a combined sensor) in the wiring harness that connect sensors to an electronic control unit (ECU) which acts as receiver 700. Depending on the neighboring wires of the communication lines 703, 704 and the activity on these wires, different levels or a different spectrum of noise may be coupled into the signal paths such that the qualities of the received signals and, correspondingly, the filtered signals 705, 706, differ.

As another example, the receiver of the filter quality information 606 (e.g. a processing component 608) may use the filter quality information 606 to select one or more high-quality signals for protocol decoding.

For example, according to the SENT-B protocol, the receiver 600 performs synchronization to the transmitters (e.g. a sensor's) oscillator clock by means of a fixed reference pulse, similar to the original SENT standard. However, the SENT-B protocol offers more than one sync-pulse to perform this task (sync pulse A and sync pulse B), as illustrated in FIG. 8.

Figure 8:
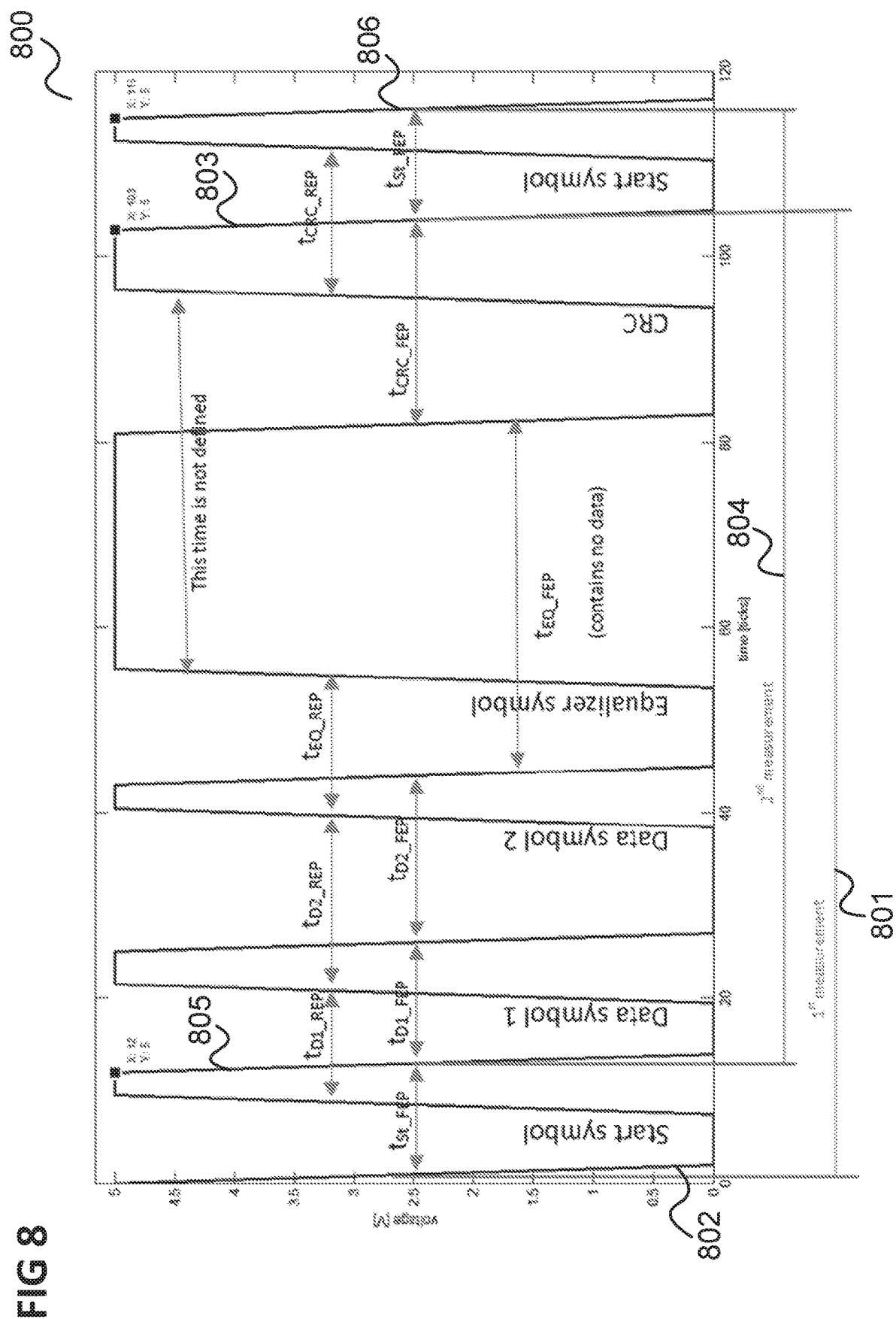
FIG. 8 shows an example of a signal waveform.

FIG. 8 shows an example of a SENT-B waveform 800.

The waveform includes rising edges and falling edges encoding, by means of the times between them, in this example, a start symbol, a first data symbol, a second data symbol, an equalizer symbol, a CRC (Cyclic Redundancy Check) information and a next start symbol. As can be seen, in this example, the high logic level of the received signal corresponds to a voltage level of 5V and the low logic level of the received signal corresponds to a voltage of 0V. At every instant of time, the received signal takes one of these two logic levels.

However, as illustrated, the analog representation of the received digital signal (as it is present in the actual circuitry) takes values between 0V and 5V for short transitional periods since the voltage changes continuously between the two voltage levels. Accordingly, in the illustration of FIG. 8, the edges are shown with a certain skew. The other illustrations of the received signals (and other signals such as the filtered received signal) may be seen as purely digital representations where the skew is omitted accordingly and the edges are shown with infinite steepness.

The receiver 600 determines a first synchronization measurement 801 (denoted by "A") between a first falling edge (denoted as "Edge 1 of A") 802 and a second falling edge (denoted as "Edge 2 of A") 803 and a second synchronization measurement 804 (denoted by "B") between a third falling edge (denoted as "Edge 1 of B") 805 and a second falling edge (denoted as "Edge 2 of B") 806.

Thus, both synchronization measurements 801, 802 include two falling edge transitions. The time between the respective two edges reveals the transmitter's (e.g. sensor's) time base. If any of these edges are affected by glitches, then the synchronization accuracy is affected. When the disturbance filter 601 passes the quality information 606 about the signal to the protocol layer (e.g. implemented by processing components 608), the protocol layer can choose the synchronization pulse which is not or less affected by a glitch. For example, the protocol layer may act as shown in table 1 (indicated by the last column "Action").

TABLE 1

| Edge 1 of A | Edge 2 of A | Edge 1 of B | Edge 2 of B | Effect | Action |
| --- | --- | --- | --- | --- | --- |
| glitch | ok | ok | ok | A inaccurate | Choose B |
| ok | glitch | ok | ok | A inaccurate | Choose B |
| ok | ok | glitch | ok | B inaccurate | Choose A |
| ok | ok | ok | glitch | B inaccurate | Choose A |
| ok | strong glitch | light glitch | ok | Both inaccurate, A is worse | Choose B, notify application |
| ok | strong glitch | strong glitch | ok | A and B heavily affected | Discard frame, notify application |
| medium glitch | ok | ok | Medium glitch | A and B moderately affected | Use (glitch weighted) average of A and B, notify application |
| glitch | glitch | glitch | ok | B has at least one edge without glitch | Consider B, notify application. |

Figure 9:
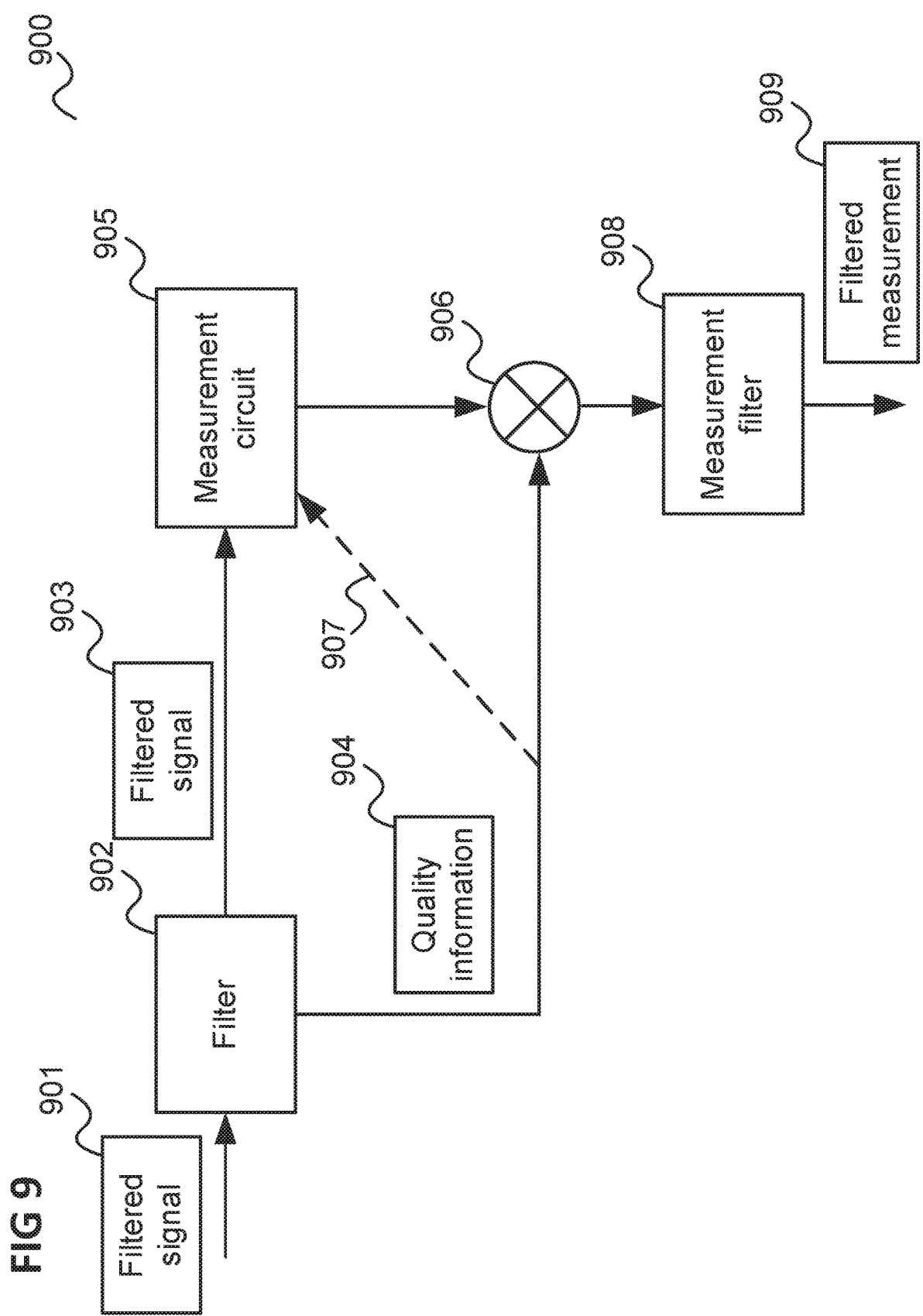
FIG. 9 shows a receiver configured to use quality information from a disturbance filter for weighing and/or compensation of measurement values.

FIG. 9 shows a receiver 900 configured to use quality information from a disturbance filter for weighing and/or compensation of measurement values.

Similarly to FIG. 6, the receiver 900 receives a (received) signal 901 via a communication line and includes a disturbance filter 902 configured to generate a filtered signal 903 as well as quality information about the received signal 901 (which can also be seen as quality information about the filtered signal 903, since the quality of the filtered signal 903 will in most cases rise and fall with the quality of the received signal 901). In this example, the filtered signal 903 is provided to a measurement circuit 905 which may be implemented by the processing components 608 and/or the processor 610. For example, the measurement circuit 905 measures the time difference between two edges for synchronization as explained with reference to FIG. 8 or something else, like the Baud rate of the communication. In any case, the measurement circuit 905 generates a measurement value. Over time, the measurement circuit 905 generates a plurality of measurement values (such as measurement A and measurement B in the example described with reference to FIG. 8 or subsequent measurements of the Baud rate), Each measurement value is supplied, along with the corresponding quality information, to a weighing circuit 906. The quality information corresponding to a measurement value is the quality information for that received signal (or that part of the received signal) based on which the measurement circuit 905 has generated the measurement value.

The weighed measurement values are then supplied to a measurement filter 908 which generates a filtered measurement value 909. By the weighing by weighing circuit 906 (which may also be seen to be part of the measurement filter 908) those measurement values are given a higher weight (importance) in the filtering that correspond to received signals (or parts of a received signal) with higher quality. Please note that the measurement filter 908 generates the filtered measurement value 909 such that it is not falsified by the weights (e.g. sums the weighted measurement values and divides by the sum of weights).

The approach of FIG. 9 may for example be applied for Baud rate adjustment of UART signal. For example, two electronic components communicate via an asynchronous interface where each communication partner has its own clock source (e.g. UART interface). The UART data is sent by the transmitter according to its transmitter clock and is received by the receiver (e.g. corresponding to receiver 900) according to its receiver clock. If the transmitter clock and the receiver clock differ by more than a defined limit (e.g. 3% for standard UART communication), the messages cannot be transferred correctly.

To circumvent this problem, some parts of the UART traffic may be used in the receiver 900 to capture information about the transmitter timing, e.g. by measurement circuit 905. With this information, the receiver 900 may tune its timing to adjust to the transmitter timing. Unfortunately, there may be noise or all type of disturbances on the UART data lines that may disturb these measurements. The disturbance filter 902 may remove noise or glitches, but the filter output signal 903 does not necessarily represent the full information coming from the transmitter, because some edges of the signal may be delayed differently (depending on the quantity of noise present at that point in time). Therefore, the filter 902 also generates the quality information 904 which allows weighted filtering of the measurement values by the measurement filter.

Alternatively (or in addition), the measurement circuit 905 may itself be provided with the quality information (as indicated by arrow 907) and may compensate measurement values. For example, the quality information for a received signal (or part of a received signal) indicates how long the filter 902 needed to filter a transition on the received signal 901. The measurement circuit 905 may add a delay compensation to a corresponding measurement (e.g. a measured edge timing) accordingly. The delay compensation allows minimizing the effects of different resulting filtering times for different edges if the filter outputs an information how long it took to indicate a stable transition.

Figure 10:
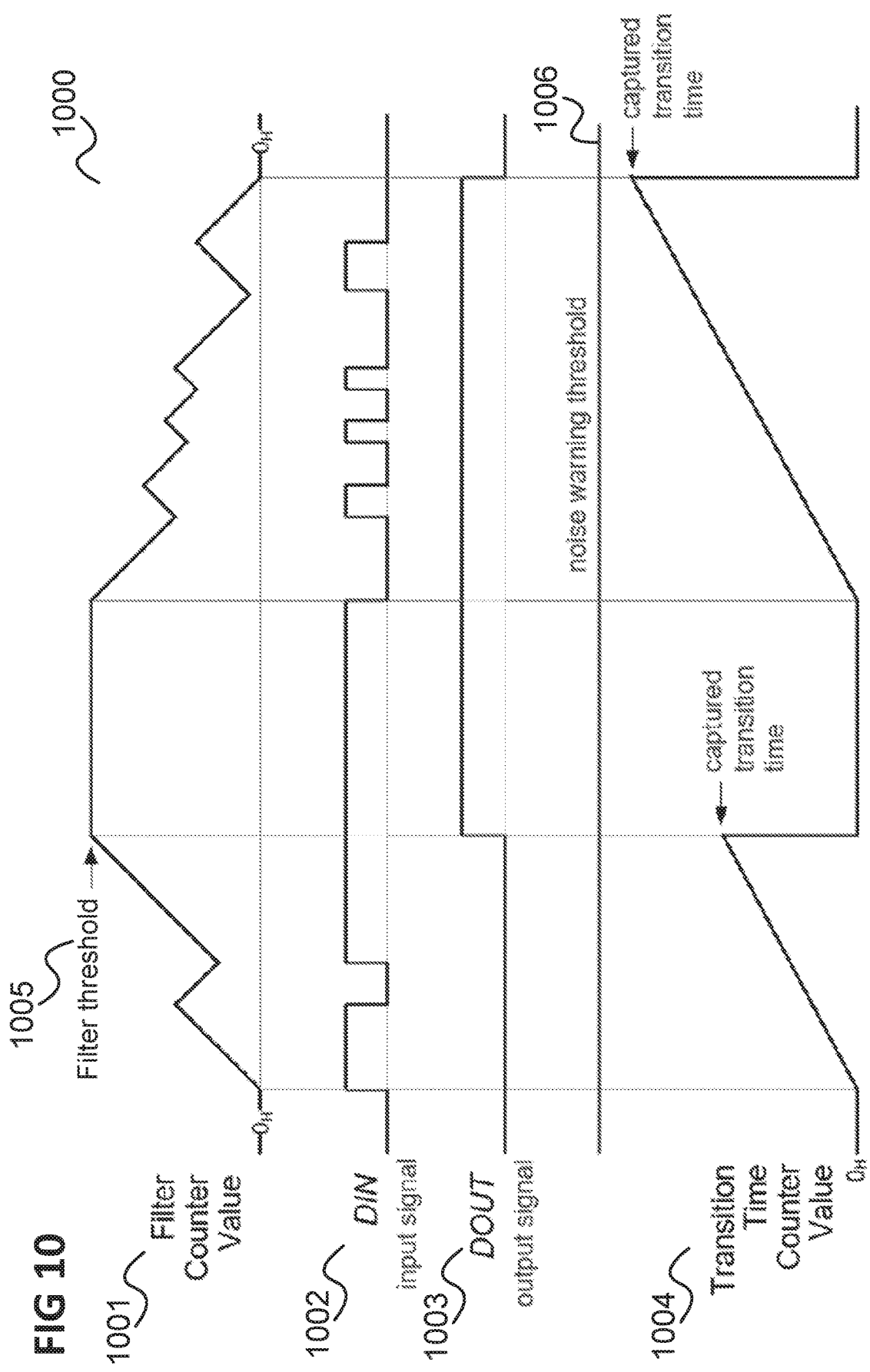
FIG. 10 shows diagram illustrating an example of a filter behavior according to an embodiment.

FIG. 10 shows a diagram 1000 illustrating an example of a filter behavior according to an embodiment.

For example, the filters 601, 701, 702 and 902 operate according to the filter behavior illustrated in FIG. 10.

The diagram 1000 includes for sub-diagrams 1001, 1002, 1003, 1004 showing the filter counter value (e.g. of counter 609), the filter input signal, the filter output signal and a transition time counter value (which may be output by the filter as quality information 606, 707, 708 and 904), respectively.

In this example, the filter is based on an up/down counter mechanism and an averaging behavior (similar to an integrator). As long as the input value is 0 (i.e. low), the counter counts down (but not below 0), whereas is counts up (but not above the filter threshold 1005) while the input is 1 (i.e. high). It should be noted that the roles of the logic 0 and the logic 1 may also be reversed depending on the transmission protocol.

The filter sets the data output to 0 when the counter reaches 0 and sets the data output to 1 when the counter reaches the filter threshold 1005. All other counter values do not change the data output value of the filter. Noise or glitches lead to counting actions of the counter, but do not necessarily change the output value of the filter.

It should again be noted that the filter threshold 1005 can be seen to correspond to a filter time threshold or filter depth: when the counter starts counting and continuously counts upward, the counter value reaches the filter threshold 1005 after a time (e.g. in clock cycles) corresponding to the filter time threshold or filter depth (and analogously for counting down).

The filter also measures the transition time, i.e. the time between starting to count and reaching the filter time threshold 1005, i.e. time while the filter counter is counting (i.e. not sitting on 0 or the filter time threshold). A transition time starts at a change of the filter input (to a level differing from the current filter output). Without any noise or glitches, the transition time would be given by the filter time threshold.

In case of noise or glitches present during the transition, the reaction time, i.e. the transition time, gets longer. The difference between the actual transition time and the filter time threshold can be seen as an indication of how many glitches or how much noise has been present during the transition time, i.e. as an indication of the pollution of the received signal.

In case a glitch or noise leads to that the filter counter starts counting from a starting value (filter threshold or 0) but the data output of the filter is not changed until the transition time counter value reaches a noise warning threshold 1006, this may be considered as a case of a lot of (e.g. too much) noise and the filter outputs a noise warning. For example, if the transition time counter value reaches the noise warning threshold 1006, the filter may inform other units that there is too much noise on the signal line or transitions may take very long or may even be erroneous due to noise. In one embodiment, parts of a message received from a bus may be discarded if the noise warning threshold is hit during the message.

In some embodiments, the value of the transition time counter may be sampled and the sampled values may be forwarded to a processing unit or processing elements. There, a difference between a former sampled value of the transition counter and a new one may be calculated to extract an information about the amount of glitches or noise present during the time interval between the samples.

In case the difference between the transition time counter value captured at the end of a transition and the filter time threshold is small compared to the filter time threshold (e.g. for a plurality of subsequent times), the filter may reduce its length, i.e. may reduce the filter time threshold. In other words, a filter controller, for example, may be configured to adjust the filter time threshold depending on the noise level in that way.

As mentioned above, the transition time (measured by the transition time counter value when a transition of the output signal occurs) may be used for compensation of measurements, e.g. by measurement circuit 905. That is explained in more detail in the following with reference to FIGS. 11 and 12.

Figure 11:
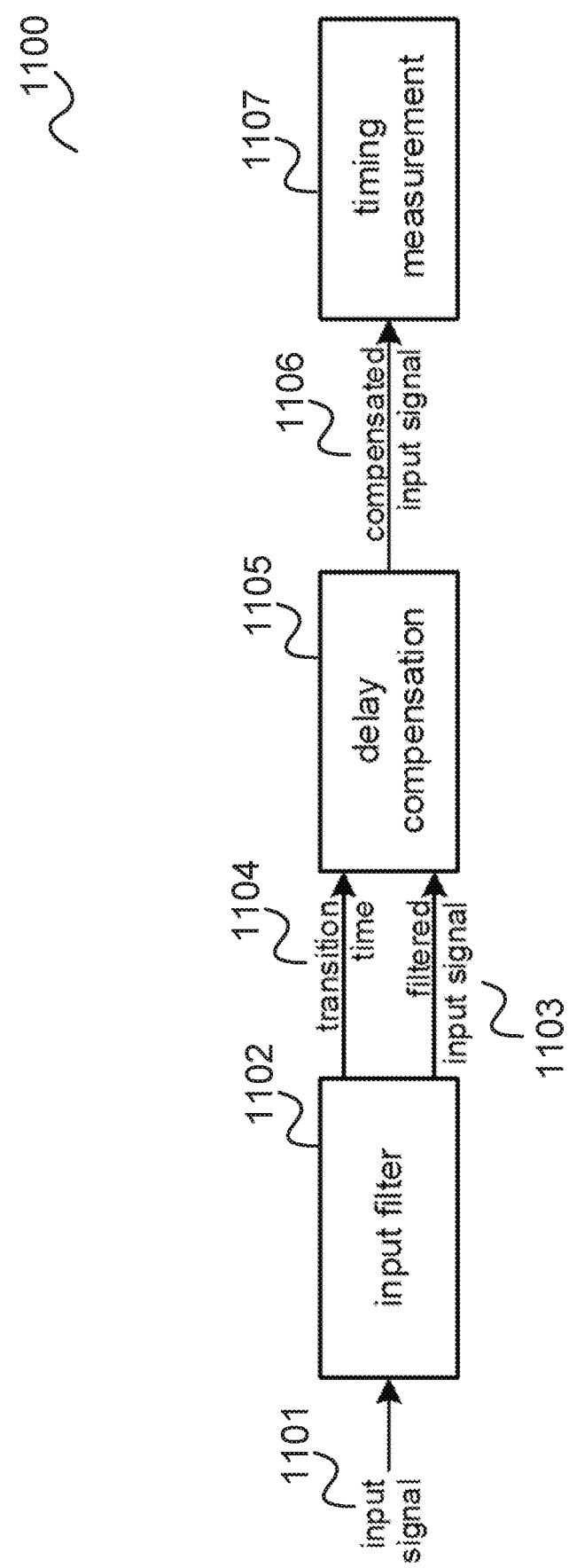
FIG. 11 shows a receiver with delay compensation.

FIG. 11 shows a receiver 1100 with delay compensation.

Similarly to FIGS. 6 and 9, the receiver 1100 receives a (received) signal 1101 via a communication line and includes a disturbance filter 1102 configured to generate a filtered signal 1103 as well as quality information 1104 about the received signal 1101 which is in this example a filter transition time as explained with reference to FIG. 10. The disturbance filter 1102 supplies both to a delay compensation circuit 1105 which applies a delay compensation on the filtered input signal 1103 based on the transition time 1104 to generate a compensated (filtered) input signal 1106 which may then for example be used by a timing measurement circuit 1107 for determining a timing (e.g. for synchronization as explained with reference to FIG. 8).

This means that the information about the quality of the signal transition (transition timing) is used to reduce the impact of noise on timing measurements. For example, the delay compensation circuit 1105 delays the respective edge (to which the transition time pertains) of the filtered input signal by a function of the transition time that has been determined for that edge.

Figure 12:
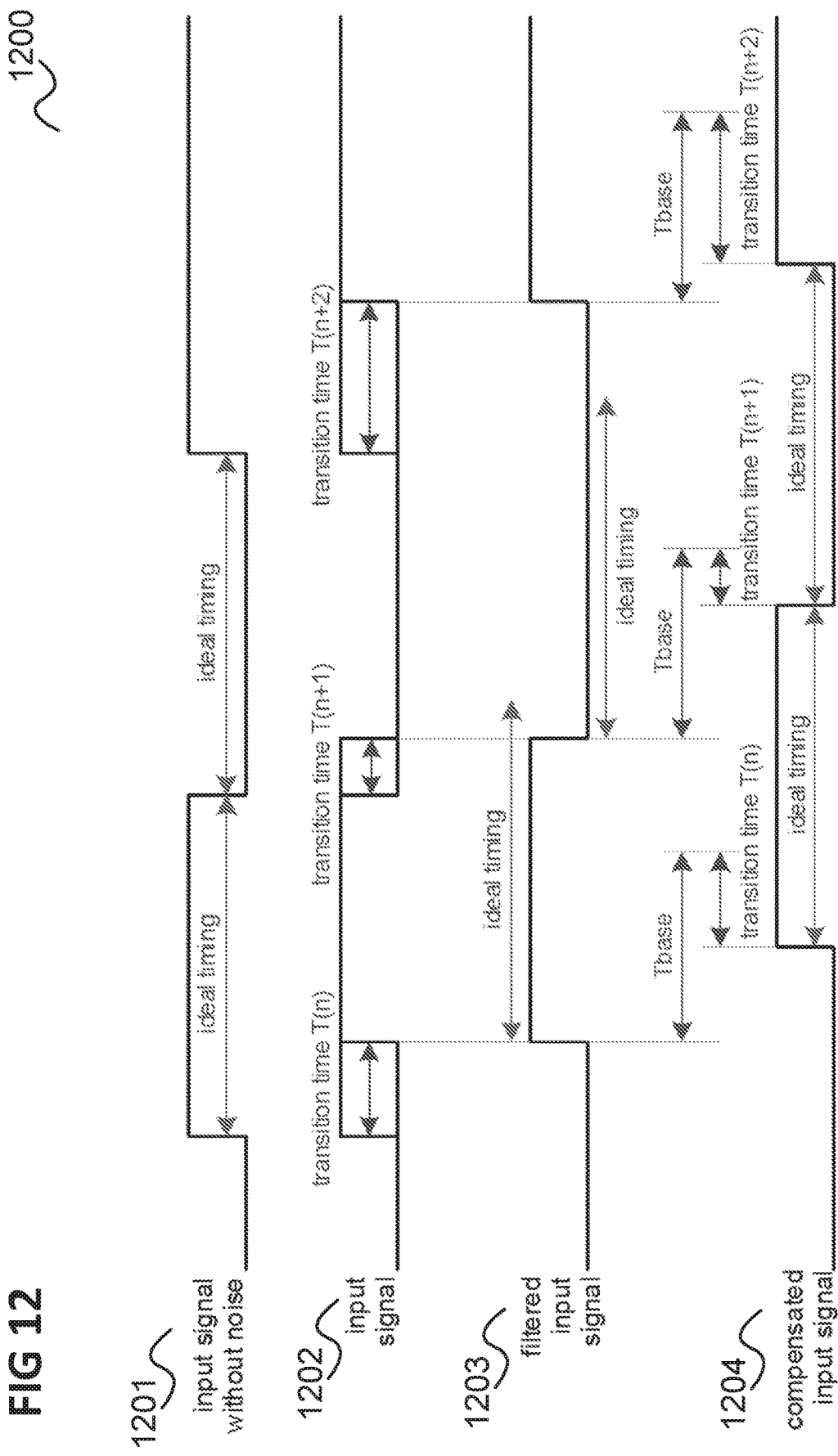
FIG. 12 shows a diagram illustrating an example for a delay compensation of a filtered input signal based on a filter transition time.

FIG. 12 shows a diagram 1200 illustrating an example for a delay compensation of a filtered input signal based on a filter transition time.

The diagram 1200 includes four sub-diagrams 1201 to 1204 showing the ideal received signal without disturbances, the received signal with disturbances, the filtered received signal (input signal for delay compensation) and the compensated filtered received signal, respectively.

As illustrated, for example, the delay compensation circuit 1105 applies a delay given by a constant Tbase minus x*transition time T, where x is a weighing factor (x may be 1). Another possibility (not shown in FIG. 12) to delay by Tbase minus x*(transition time minus filter time threshold).

The compensated filtered received signal (fourth sub-diagram 1204) shows the same sequence of edges as the filtered received signal (third sub-diagram 1203), but delayed. Assuming the constant Tbase being bigger than the maximum transition time T, the edges of the compensated filtered received signal appear delayed, but the timing relation between the events (edges) is much closer to the original timing without noise (first sub-diagram 1201).

The factor x may be set to 1 if the noise is due to ringing or reflections on a signal line after a change of the signal level. In this case, the source of the noise is the transition of a signal level itself (no noise before the transition, because signal settles after each transition).

The factor of x may be set differently from 1 (e.g. smaller) if there may be some noise around the signal transition. This may be the case where a magnetic Hall sensor (Hall comparator) changes its output due to a change in the magnetic field. If the hysteresis is not very big, there may already be "false" pulses before the "real" event, because the comparator may be more sensitive to noise when it is close to its switching point.

In the example given in FIG. 12, the disturbances are assumed due to a change of the input signal (ringing, reflections, etc.) and the delay compensation works with x=1.

Regarding implementation examples of a disturbance filter, it should be noted that the digital disturbance filters described above (e.g. with the behavior of FIG. 10) can be seen to resemble a linear first order low pass filter. Accordingly, according to various embodiments, they may be enhanced by moving to a higher order filter and/or by adding nonlinearity.

According to one embodiment, a disturbance filter may be used having two counters running in parallel (instead of one as described above). For example, such a filter includes two counters named count_filter and count_fast wherein the count_filter is the "normal" disturbance filter counter as described above which is incremented by one for every clock cycle where the filter input signal is unequal to the current filter value and decremented by one when the input signal is equal to the output signal. The filter flips its output value as soon as count_filter reaches the limit value.

The second counter count_fast is incremented by one for every clock cycle count_filter is not zero and set to 0 every clock cycle count_filter is zero.

So, count_fast counts in parallel to count_filter, but reaches the limit value earlier as count_filter because it is not being affected by disturbances that slows down count_filter. Thus, when count_fast reaches the threshold limit, this is the point in time when the filter output would have changed in the absence of any disturbance. For ideal, disturbance free edges count_filter and count_fast reach the limit value at the same time.

An additional counter count_disturbance_delay and a capture register capture_disturbance_delay can be used to count and capture the number of clock cycles from count_fast reaching limit value to count_filter reaching limit value. Thus with each filter output transition the effective signal delay due to disturbances is available as capture_disturbance_delay.

It should be noted that when using an integer type counter (as illustrated in FIG. 10) instead of natural number type counter (as illustrated in FIG. 3), the following rules may be applied to get the same filter effect as for the natural type counter:

1. The resetting of the counters when reaching the limit is dropped.
2. Incrementing/decrementing is done when input signal is logic 1/logic 0, respectively (instead of when an XOR combination of input and output is 1).
3. The output is set to 1 when the filter counter reaches the upper filter threshold and is set to 0 when the filter counter reaches the lower filter threshold (which is 0 in the example of FIG. 10), instead of toggling or copy from input in case of the natural type counter.

It should be noted that thus, while a similar functionally may be achieved with both versions, the integer version allows easier connection to a pre-filter to achieve higher order filtering.

For a nonlinear enhancement, for example, instead of always incrementing by one and decrementing by one, a variable increment amount incr_var and also a variable decrement amount decr_var can be introduced for the filter counter.

For example, the increment could be one until the counter reaches a certain (configurable) threshold and two as soon as the threshold is reached. Reaching the threshold means that there is already some indication that a signal transition is on the way, so that an acceleration is warranted.

Keeping the increment and decrement amounts configurable and also offering more than one configurable threshold enables to tailor the filter for the specific needs of a given application context. In addition to that, it is possible to use a filtered version of the filter counter as a basis for the flexible increment selection.

For a higher order filter, two or more linear filters can be chained to create higher order low pass filters. For example, for a first filter, an integer counter count_first may be incremented when the input signal is logic 1 and be decremented when the input signal is logic 0. The counter would not increment beyond its positive upper limit value and also would not decrement beyond its negative lower limit. As soon as count_first reaches a positive output threshold, the first filter sets its filter output to logic 1. As soon as count_first falls to a negative output threshold, the first filter sets its filter output to logic 0. The output thresholds can coincide with the threshold values.

A second stage filter with a second counter count_second may then be driven by count_first instead of the 1 bit logic output of the first stage. For example, the increment of count_second could be count_first/div, where div is a configurable parameter having a value of 1, 2, 4, 8, . . . . As mentioned above, integer type for the counters may be used for higher-order filtering due to easier implementation.

Figure 13:
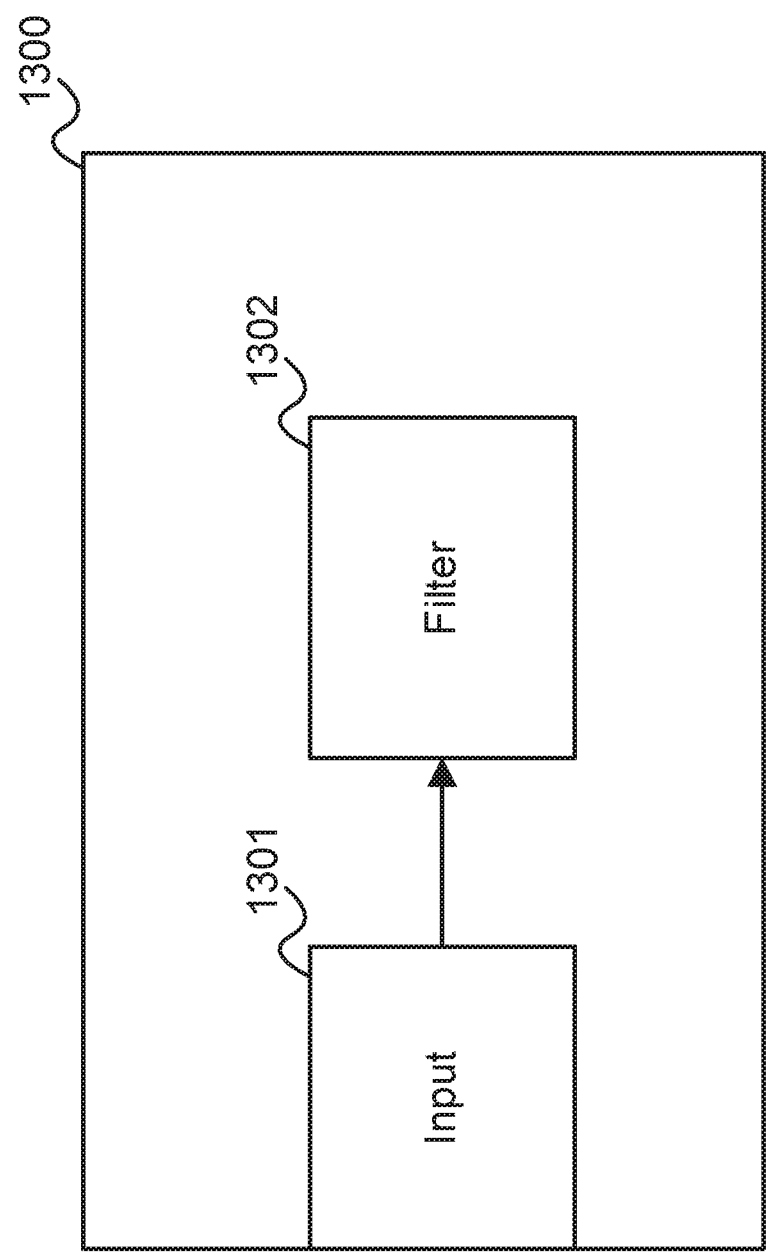
FIG. 13 shows a receiver according to an embodiment.

In summary, according to various embodiments, a receiver is provided as illustrated in FIG. 13.

FIG. 13 shows a receiver (device) 1300 according to an embodiment.

The receiver 1300 includes an input 1301 configured to receive a digital input signal (e.g. a signal received by the receiver via a communication channel, e.g. a communication line).

The receiver 1300 further includes a digital filter 1302 configured to deliver a filtered digital output signal and to deliver stability information.

The digital filter is configured to enter or stay in a transition state (e.g. an active state) after a transition at the input signal, leave the transition state when the input signal is considered being stable, update the output signal when leaving the transition state and deliver the stability information indicating transitions at the input signal during transition state.

The filter may be considered in an active or transition state while the input value is not equal to the output value (e.g. during a transition), or while the input value is equal to the output value and the input value is not yet considered as stable (after a too short change of the input value that has not lead to a change of the output value, e.g. due to noise effects). While the input value is equal to the output value and the input value is considered as stable, the filter may be considered being in an idle or inactive mode. In some embodiments, the filter may contain one or more counters. Depending on the implementation, a counter belonging to the filter may count even if the filter is in idle or inactive mode.

If a transition at the filter input was due to noise or a glitch, the output of the filter may be kept constant and may be considered as updated with an identical value. An update of the filter output value at the end of the active or transition time does not necessarily lead to a change of the output value.

According to various embodiments, in other words, a filter changes, after an input level change, its output level depending on how constantly (i.e. at what degree of stability) the input level maintains the level it has changed to (i.e. the second logic level). This means that if the input signal, while the filter is in transition state, returns often or for long periods to the level it comes from (i.e. to the first logic level) this is regarded as the logic level not being stably maintained. In contrast, if the input signal, while the filter is in transition state, returns rarely or merely for short time periods to the first logic level this is regarded as the logic level not being stably maintained.

One way to implement this is approach is, as described above, a counter which counts up when the signal has the first logic level and counts down when the signal has the second logic level. The filter is configured changes its output signal when the counter value reaches a filter threshold. When the input signal stably maintains the second logic level, the counter counts upward for most of the time and thus the time until the filter changes its output signal is shorter than if the input signal dos not stably maintain the second logic level because the counter often counts down.

It should be noted that the counter may also be implemented inversely and count down from a predetermined value when the input signal has the second logic level as it is the case in the example of FIG. 10 for the second transition (where the counter counts down from the filter threshold 1005).

The filter exits the transition state (i.e. enters an inactive state) when it changes the output signal. It may also exit the transition state when the degree with which the input signal maintains the second logic level is too low, e.g. when the counter (in case of a counter counting up when the input signal has the second logic level) reaches a lower threshold (e.g. its initial value, e.g. zero).

Since the time at which the filter changes its output level depends on the stability with which the input signal maintains the second logic level the time after which the filter changes its output signal (after entering transition state upon an input signal logic level change) may vary. This time is also referred to as the transition time of the filter for the input signal change. It can be seen as stability information, i.e. an information about the quality of the input signal (in a time window after the input signal change) and the filter may be configured to output this information along with the output signal (e.g. the filtered input signal) by the filter. The filter may be configured to output other information (in alternatively or in addition to the transition time) about the stability with which the input signal maintains the second logic level. For example, the information may include a number of glitches or a length of one or more glitches (during which the input signal returns to the first logic level).

Further components of the receiver may process the filter's output signal (i.e. the filtered input signal) based on this information, e.g. for delay compensation, measurement filtering, selecting of a channel of a plurality of multiple channels, outputting a warning regarding low signal (or communication link) quality etc.

Thus, according to various embodiments, the approach of FIG. 13 can be seen to take the nature of disturbances (glitches or noise) into account and also uses the information that comes along with a glitch for higher purposes than just removing the glitch. This is achieved by a filter structure that does not only filter the noise (or glitches) but also delivers information about the quality of the signal (i.e. the "degree of pollution"), e.g. by elaborating transition timings or timings of unstable input signal(s). A processing component may use the knowledge about the degree of pollution (output as quality information, i.e. information about the input signal quality, by the filter) to validate or invalidate information treated by the information channel (via which the filter's input signal is transmitted) and/or to adapt the characteristics of the filter (e.g. the filter threshold as described in the above examples) accordingly. A processing component may also use that knowledge about the transition timing to reconstruct the original timing without noise (as good as possible).

Depending on whether the input signal is initially at a low level or a high level the first logic level (or first logic state) may be a low level (0) and the second logic level (or second logic state) a high level (1) or the other way round. The filter may change its output to the same level as the input signal (i.e. the second logic level). However, the filter may also include an inversion.

The filter enters transition state when it is in inactive state upon a level change of the input signal. This means there is an "initial" level change of the input signal (per transition state of the filter) that triggers the transition state.

The receiver and its components, in particular the input and the filter may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program. Any other kind of implementation of the respective functions which are described herein may also be understood as a "circuit" in accordance with an alternative embodiment.

According to various embodiments, a method is performed (e.g. by a receiving communication device) as illustrated in FIG. 14.

FIG. 14 shows a flow diagram 14 illustrating a method for processing an input signal.

In 1401 a filter enters or stays in a transition state after a transition of the input signal.

In 1402 the filter leaves the transition state when the input signal is considered being stable. In 1403 an output signal (of the fitter) is updated when leaving the transition state.

In 1404 the filter delivers stability information indicating transitions at the input signal during the transition state.

Various Examples are described in the following:

Example 1 is a receiver as illustrated in FIG. 13.

Example 2 is the receiver according to Example 1, wherein the stability information includes information about the time the filter has been in the transition state until the change of the level of the output signal.

Example 3 is the receiver according to Example 1 or 2, wherein the stability information includes at least one of information about a number of disturbances in the input signal, a length of disturbances in the input signal, a time distance between disturbances in the input signal, an indication about a disturbance being currently present in the input signal and an indication that a disturbance is present in a certain time window after or around the time the filter enters the transition state.

Example 4 is the receiver according to any one of Examples 1 to 3, wherein the transition is a transition of the input signal from a first logic level to a second logic level and the filter is configured to consider the input signal as stable depending on a stability with which the input signal has maintained the second logic level.

Example 5 is the receiver according to Example 4, wherein the stability with which the input signal has maintained the second logic level is based on a relation of the time the input signal had the second logic level and the time the input signal had the first logic level while the filter has been in transition state.

Example 6 is the receiver according to any one of Examples 1 to 5, wherein the filter is configured to leave transition state depending on how long the input signal had the second logic level and how long the input signal had the first logic level during transition state.

Example 7 is the receiver according to any one of Examples 1 to 6, wherein the filter is configured to leave transition state if the input signal returns to the first logic level for longer than an allowed time period.

Example 8 is the receiver according to Example 7, wherein the allowed time period depends on how long the digital input signal had the second logic level since the filter entered the transition state.

Example 9 is the receiver according to any one of Examples 1 to 8, wherein the transition is a transition of the input signal from a first logic level to a second logic level and wherein the filter is configured to, when it is in the transition state, build up a measure when the input signal has the second logic level and reduce the measure when the input signal has the first logic level and to change the output signal when the measure exceeds a predetermined threshold.

Example 10 is the receiver according to Example 9, wherein the filter is configured to reduce the predetermined threshold when the input signal has maintained a logic level well for one or more logic level changes.

Example 11 is the receiver according to Example 9 or 10, wherein the measure is a counter value being incremented when the input signal has the second logic level and being decremented when the input signal has the first logic level or a counter value being decremented when the input signal has the second logic level and being incremented when the received level has the first logic level.

Example 12 is the receiver according to any one of Examples 1 to 11, wherein the filter includes at least one counter and the transition state is a counting state.

Example 13 is the receiver according to any one of Examples 1 to 12, including further processing components configured to process the filtered output signal based on the stability information.

Example 14 is the receiver according to Example 13, wherein the processing of the filtered output signal includes a delay compensation of level changes in the output signal based on the stability information.

Example 15 is the receiver according to Example 13 or 14, wherein the processing of the filtered output signal includes performing measurements of the filtered output signal and weighing the measurements based on the stability information.

Example 16 is the receiver according to Example 15, wherein each measurement is based on at least one level change of the filtered output signal and is weighed based on the stability information.

Example 17 is the receiver according to any one of Examples 1 to 16, wherein the filter is configured to output a disturbance warning signal when the time the filter has been in the transition state exceeds a predetermined threshold.

Example 18 is a method for processing a digital input signal as illustrated in FIG. 14.

Example 19 is the method according to Examples 18, wherein the stability information includes information about the time the filter has been in the transition state until the change of the level of the output signal.

Example 20 is the method according to Example 18 or 19, wherein the stability information includes at least one of information about a number of disturbances in the input signal, a length of disturbances in the input signal, a time distance between disturbances in the input signal, an indication about a disturbance being currently present in the input signal and an indication that a disturbance is present in a certain time window after or around the time the filter enters the transition state.

Example 21 is the method according to any one of Examples 18 to 20, wherein the transition is a transition of the input signal from a first logic level to a second logic level and the filter considers the input signal as stable depending on a stability with which the input signal has maintained the second logic level.

Example 22 is the method according to Example 21, wherein the stability with which the input signal has maintained the second logic level is based on a relation of the time the input signal had the second logic level and the time the input signal had the first logic level while the filter has been in transition state.

Example 23 is the method according to any one of Examples 18 to 22, wherein the filter leaves transition state depending on how long the input signal had the second logic level and how long the input signal had the first logic level during transition state.

Example 24 is the method according to any one of Examples 18 to 23, wherein the filter leaves transition state if the input signal returns to the first logic level for longer than an allowed time period.

Example 25 is the method according to Example 24, wherein the allowed time period depends on how long the digital input signal had the second logic level since the filter entered the transition state.

Example 26 is the method according to any one of Examples 18 to 25, wherein the transition is a transition of the input signal from a first logic level to a second logic level and wherein the filter, when it is in the transition state, builds up a measure when the input signal has the second logic level and reduces the measure when the input signal has the first logic level and to change the output signal when the measure exceeds a predetermined threshold.

Example 27 is the method according to Example 26, wherein the filter reduces the predetermined threshold when the input signal has maintained a logic level well for one or more logic level changes.

Example 28 is the method according to Example 26 or 27, wherein the measure is a counter value being incremented when the input signal has the second logic level and being decremented when the input signal has the first logic level or a counter value being decremented when the input signal has the second logic level and being incremented when the received level has the first logic level.

Example 29 is the method according to any one of Examples 18 to 28, wherein the filter includes at least one counter and the transition state is a counting state.

Example 30 is the method according to any one of Examples 18 to 29, including further processing the filtered output signal based on the stability information.

Example 31 is the method according to Example 30, wherein the processing of the filtered output signal includes a delay compensation of level changes in the output signal based on the stability information.

Example 32 is the method according to Example 30 or 31, wherein the processing of the filtered output signal includes performing measurements of the filtered output signal and weighing the measurements based on the stability information.

Example 33 is the method according to Example 32, wherein each measurement is based on at least one level change of the filtered output signal and is weighed based on the stability information.

Example 34 is the method according to any one of Examples 18 to 33, wherein the filter outputs a disturbance warning signal when the time the filter has been in the transition state exceeds a predetermined threshold.

According to another example, a reception filter with a signal input and a signal output is provided configured to enter a transition state when its input signal changes from a first logic level to a second logic level; change the logic level of the output signal after a time in transition state depending on the how well the input signal has maintained the second logic level while the filter has been in transition state and having a quality information output configured to output an information about the time.

According to a further example a receiver is provided including an input configured to provide a digital received signal and a filter configured to output a digital output signal, enter a transition state when the received signal changes from a first logic level to a second logic level, change the logic level of the output signal after a time in transition state depending on the stability with which the received signal has maintained the second logic level while the filter has been in transition state and output an information about the stability with which the received signal has maintained the second logic level.

According to a further example, a method for processing a digital input signal is provided including a filter entering a transition state when the received signal changes from a first logic level to a second logic level; changing the logic level of a filter output signal after a time in transition state depending on the stability with which the received signal has maintained the second logic level while the filter has been in transition state and providing an information about the stability with which the received signal has maintained the second logic level.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 Transmission arrangement
101 Transmitter
102 Receiver
103 Communication channel
104, 105 Clock generators
106 Message
107 Edge detector
108 Sampler
109 Decoder
110 Signal
111 Filter
200 Receiver
201 Filter
202 Signal
203 Communication line
204 Input
205 Received Signal
207 Filtered signal
208 Processing components
209 Counter
210 Processor
211 Software
300 Signal diagram
301 Filter input signal
302 Filter output signal
400 Signal diagram
401 Filter input signal
402 Filter output signal
403 Filter counter value
500 Signal diagram
501 Glitch
502 Filter input signal
503 Filter counter value
504 Filter threshold
505 Filter output signal
600 Receiver
601 Filter
602 Signal
603 Communication line
604 Input
605 Received Signal
606 Quality information
607 Filtered signal
608 Processing components
609 Counter
610 Processor
611 Software
700 Receiver
701, 702 Filters
703, 704 Communication lines
705, 706 Filtered signals
707, 708 Quality information
709 Controller
710 Further processing components
711 Selector
800 Signal diagram
801 Measurement
802, 803 Falling edges
804 Measurement
805, 806 Falling edges
900 Receiver
901 Received signal
902 Filter
903 Filtered signal
904 Quality information
905 Measurement circuit
906 Weighing circuit
907 Arrow
908 Measurement filter
909 Filtered measurement
1000 Signal diagram
1001-1004 Sub-diagrams
1100 Receiver
1101 Input signal
1102 Filter
1103 Filtered signal 1104 Transition time
1105 Delay compensation circuit
1106 Compensated filtered signal
1107 Timing measurement circuit
1200 Signal diagram
1201-1204 Sub-diagrams
1300 Receiver
1301 Input
1302 Filter
1400 Flow diagram
1401-1404 Processing steps

What is claimed is:

1. A receiver comprising
an input configured to receive a digital input signal; and
a digital filter configured to deliver a filtered digital output signal and to deliver stability information,
wherein the digital filter is configured to
enter or stay in a transition state after a transition at the input signal,
leave the transition state when the input signal is considered being stable,
update the output signal when leaving the transition state, and
deliver the stability information indicating transitions at the input signal during transition state.

2. The receiver according to claim 1, wherein the stability information comprises information about the time the filter has been in the transition state until the change of the level of the output signal.

3. The receiver according to claim 1, wherein the stability information comprises at least one of information about a number of disturbances in the input signal, a length of disturbances in the input signal, a time distance between disturbances in the input signal, an indication about a disturbance being currently present in the input signal and an indication that a disturbance is present in a certain time window after or around the time the filter enters the transition state.

4. The receiver according to claim 1, wherein the transition is a transition of the input signal from a first logic level to a second logic level and the filter is configured to consider the input signal as stable depending on a stability with which the input signal has maintained the second logic level.

5. The receiver according to claim 4, wherein the stability with which the input signal has maintained the second logic level is based on a relation of the time the input signal had the second logic level and the time the input signal had the first logic level while the filter has been in transition state.

6. The receiver according to claim 1, wherein the filter is configured to leave transition state depending on how long the input signal had the second logic level and how long the input signal had the first logic level during transition state.

7. The receiver according to claim 1, wherein the filter is configured to leave transition state if the input signal returns to the first logic level for longer than an allowed time period.

8. The receiver according to claim 7, wherein the allowed time period depends on how long the digital input signal had the second logic level since the filter entered the transition state.

9. The receiver according to claim 1, wherein the transition is a transition of the input signal from a first logic level to a second logic level and wherein the filter is configured to, when it is in the transition state, build up a measure when the input signal has the second logic level and reduce the measure when the input signal has the first logic level and to change the output signal when the measure exceeds a predetermined threshold.

10. The receiver according to claim 9, wherein the filter is configured to reduce the predetermined threshold when the input signal has maintained a logic level well for one or more logic level state changes.

11. The receiver according to claim 9, wherein the measure is a counter value being incremented when the input signal has the second logic level and being decremented when the input signal has the first logic level or a counter value being decremented when the input signal has the second logic level and being incremented when the received level has the first logic level.

12. The receiver according to claim 1, wherein the filter includes at least one counter and the transition state is a counting state.

13. The receiver according to claim 1, further comprising further processing components configured to process the filtered output signal based on the stability information.

14. The receiver according to claim 13, wherein the processing of the filtered output signal comprises a delay compensation of level changes in the output signal based on the stability information.

15. The receiver according to claim 13, wherein the processing of the filtered output signal comprises performing measurements of the filtered output signal and weighing the measurements based on the stability information.

16. The receiver according to claim 15, wherein each measurement is based on at least one level change of the filtered output signal and is weighed based on the stability information.

17. The receiver according to claim 1, wherein the filter is configured to output a disturbance warning signal when the time the filter has been in the transition state exceeds a predetermined threshold.

18. A method for processing a digital input signal comprising;
entering or staying in a transition state for a filter after a transition of the input signal,
leaving the transition state when the input signal is considered being stable,
updating an output signal when leaving the transition state, and
delivering stability information indicating transitions at the input signal during the transition state.

* * * * *